United States Patent
Thomas

(10) Patent No.: US 6,233,018 B1
(45) Date of Patent: May 15, 2001

(54) VIDEO SIGNAL PROCESSING

(75) Inventor: Graham Alexander Thomas, East Sussex (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 09/284,254

(22) PCT Filed: Apr. 24, 1997

(86) PCT No.: PCT/GB97/01140

§ 371 Date: Jun. 7, 1999

§ 102(e) Date: Jun. 7, 1999

(87) PCT Pub. No.: WO98/16060

PCT Pub. Date: Apr. 16, 1998

(30) Foreign Application Priority Data

Oct. 9, 1996 (GB) .................................................. 9621055

(51) Int. Cl.$^7$ ...................................................... H04N 7/01
(52) U.S. Cl. ............................................ 348/452; 348/448
(58) Field of Search ................................... 348/448, 452, 348/458, 441, 447

(56) References Cited

U.S. PATENT DOCUMENTS

| | | | |
|---|---|---|---|
| 5,119,193 | * | 6/1992 | Noji .................................... 348/452 |
| 5,177,610 | * | 1/1993 | Wilkinson ............................ 348/452 |
| 5,410,356 | | 4/1995 | Yasuhiro . |
| 5,534,946 | * | 7/1996 | De Haan et al. ..................... 348/452 |
| 5,786,852 | * | 7/1998 | Kim et al. ............................ 348/452 |

FOREIGN PATENT DOCUMENTS

| | | |
|---|---|---|
| 0 179 594 | 4/1986 | (EP) . |
| 0 266 079 | 5/1988 | (EP) . |
| 0 294 874 | 12/1988 | (EP) . |

OTHER PUBLICATIONS

"Fixed, Adaptive, and Motion Compensated Interpolation of Interlaced TV Pictures", by M. Weston, $2^{nd}$ International Workshop on Signal Processing for HDTV, Feb. $29^{th}$–Mar. 2, 1988.

* cited by examiner

Primary Examiner—Victor R. Kostak
(74) Attorney, Agent, or Firm—McDermott, Will & Emery

(57) ABSTRACT

Video line interpolator has delays for providing simultaneous access to a current field and at least two adjacent fields; shifters for shifting the adjacent fields in accordance with vertical motion vectors rounded to even numbers of picture lines and an interpolation filter taking information from at least three line of each of the current and shifted adjacent fields, the contributions from said adjacent fields summing to zero at low frequencies.

3 Claims, 1 Drawing Sheet

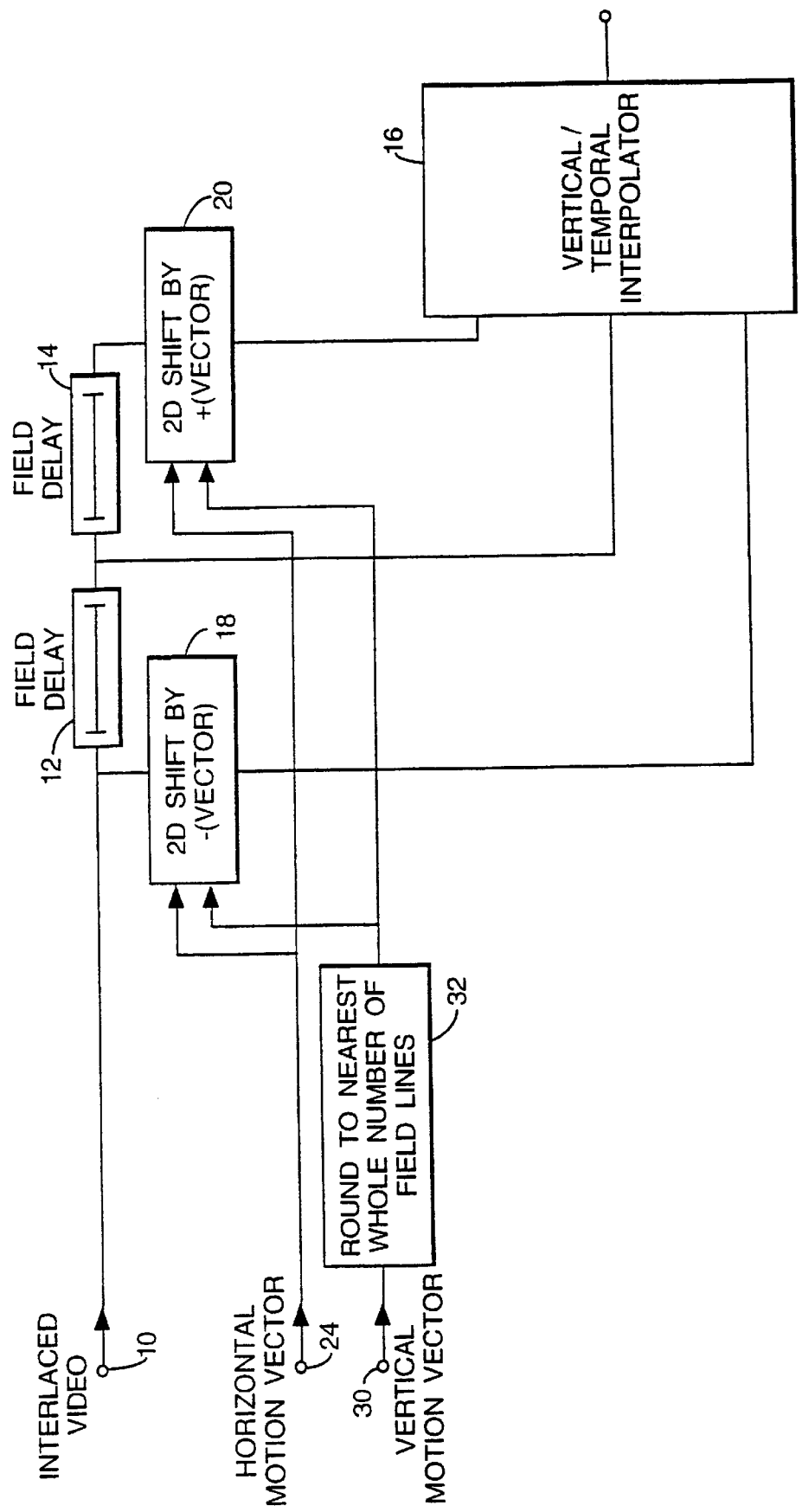

VIDEO SIGNAL PROCESSING

This invention relates to video signal processing and more particularly to the interpolation of picture lines in, for example, an interlace-to-progressive conversion.

Many techniques have been proposed for interlace-to-progressive conversion.

An interpolation filter which takes information from both the current and adjacent fields will perform well on stationary pictures but performance will generally be degraded in the presence of motion. Adaption has been proposed, with a motion detector arranged to switch from temporal to vertical interpolation in the presence of detected motion. A particular spatio-temporal interpolation filter has been proposed which provides similar performance without the need for adaption.

It is an object of this invention to provide an improved method of interpolating picture lines in a video signal, which takes advantage of motion compensation to offer improved interpolation performance without substantial processing overhead.

Accordingly, the present invention consists in one aspect in a motion compensated method of interpolating picture lines in a video signal, utilising an interpolation aperture taking information from current and adjacent fields, arranged such that the contributions from adjacent fields sum substantially to zero at low frequencies, characterised in that vertical motion information is rounded to the nearest two picture lines (per field period) and vertical motion compensation conducted through vertical shifting of the aperture.

In a further aspect, the present invention consists in apparatus for the interpolation of picture lines in a video signal, comprising delay means for providing simultaneous access to a current field and at least two adjacent fields; a source of vertical motion vectors rounded to even numbers of picture lines; shift means for shifting the adjacent fields in accordance with rounded vertical motion vectors and an interpolation filter taking information from at least three lines of each of the current and shifted adjacent fields, the contributions from said adjacent fields summing substantially to zero at low frequencies.

There is disclosed in EP 0 266 079 and in: Weston, M. 1988. *Fixed, adaptive and motion compensated interpolation of interlaced TV pictures*. 2nd International Workshop on Signal Processing for HDTV (L'aquila, Italy) Feb. 2–Mar. 29 1988, a fixed spatio-temporal interpolation which reduces the deleterious effects of motion by arranging that the contributions from adjacent fields sum substantially to zero at low frequencies.

It has surprisingly been found that a significant improvement to the performance of the fixed filter can be achieved with vertical motion compensation restricted to vertical units of even numbers of picture lines per field period. The performance of a filter according to this invention is clearly no better than that of the fixed filter at vertical motions of one picture line per field. However, it has been recognised by the present inventor that no system can deal satisfactorily with this "strobe" speed. At speeds greater than one picture line per field, filters according to the present invention offer much better performance than the known fixed filter. At high speeds, camera integration blurs the image to the extent that lack of accuracy in determining vertical motion has no material effect.

In accordance with the present invention, this vertical-temporal filter is steered to follow vertical motion in steps of two picture lines per field. That is, for vertical motion speeds below one picture line per field, it is unchanged from the fixed filter. For speeds between one and three picture lines per field, the coefficients in the outer fields are moved up and down by two picture lines in the direction of motion, and so on. Thus the coefficients in the outer fields always act on existing field lines, never on the inserted lines of zero.

Comparisons have been made between a filter according to the present invention and complex vertical interpolation filters which attempt to follow vertical motion accurately at all speeds other than those close to the strobe speed. It is found that in the presence of uncertainties in motion vectors, the performance of filters according to the present invention is in fact superior to the more complex and supposedly more accurate vertical interpolators.

The present invention is particularly suitable for use with motion information decoded from an MPEG2 or other bit rate reduced signal where uncertainties in motion vectors are to be expected.

The invention will now be described by way of example with reference to the accompanying drawing which is a block diagram showing apparatus according to one embodiment of the invention.

An interlaced video signal is received at input terminal 10 and passes to serial connected field delays 12 and 14. The mid-point of the field delays 12 and 14 forms one input to a vertical temporal interpolator 16. The input video signal, upstream of the field delays 12 and 14, passes through a two-dimensional shifter 18 to form a second input to the vertical temporal interpolator 16, whilst a signal downstream of the two field delays 12 and 14 passing through a further two dimensional shifter 20 forms the third input to the vertical-temporal interpolator.

The 2D shifters 18 and 20 are controlled through motion vectors to provide the required motion compensation. Horizontal motion vectors derived in conventional manner are received at terminal 24. These are co-timed with a video signal at the mid-point of the field delays 12 and 14. The horizontal motion vectors passed to each of the 2D shifters 18 and 20, with the shifter 20 serving to shift the field horizontally by the value of the vector. Integral pixel displacements can be effected through pixel increments in the delay introduced by the shifter. Sub-pixel accuracy can be achieved through interpolation. The 2D shifter 18 operates on the horizontal motion vector information in a similar manner, except that the shift is in the opposite direction, that is to say the horizontal shift is the value of the horizontal motion vector negatived.

Vertical motion vector information is received on terminal 30 and passes through a quantizer 32 which serves to round each vertical motion vector to the nearest whole number of field lines, that is to say to the nearest even number of picture lines. The rounded vertical motion vectors pass, again, to each of the 2D shifters 18 and 20 with the shifter 20 serving to shift (through line increments of delay) by an amount equal to the rounded vertical motion vector and the shifter 18 serving to shift through the negative of the rounded vertical motion vector.

The vertical-temporal interpolator 16 can then be seen to receive, on a centre tap, the "current" field and on the outside taps motion compensated versions of both the preceding and succeeding field. The interpolator has an aperture extending over these three fields and an appropriate number of lines, typically five. A preferred example of such an aperture is as follows.

| 0.031 |        | −0.116 |       | 0.170 |       | −0.116 |        | 0.031 |
|-------|--------|--------|-------|-------|-------|--------|--------|-------|
|       | −0.026 |        | 0.526 |       | 0.526 |        | −0.026 |       |
| 0.031 |        | −0.116 |       | 0.170 |       | −0.116 |        | 0.031 |

[Fields Lines ←→]

It will be seen that the sum of the contributions from the adjacent fields is zero, whilst the sum of the contributions from the current field is unity. As set forth in detail in EP-0 266 079, which is hereby incorporated by reference, this aperture serves to derive low vertical frequency components solely from the central or current field with higher vertical frequency components being generated partly from the lines of the current field and partly from the lines of adjacent fields.

The interpolated lines output by the vertical-temporal interpolator 16 will, in an interlace-to-progressive converter, be interleaved with existing lines. Appropriate circuitry can be employed to switch through the unmodified existing lines, alternatively with the interpolated "missing" lines. This function can effectively be performed within the vertical-temporal interpolator if alternate blank lines are inserted in the input signal and a central coefficient of 1.000 added to the filter aperture, with zeros in the remaining "empty" slots.

In a modification, the relative contribution of the current and adjacent fields can be varied in accordance with the motion. That is to say with large motion vectors, the coefficients applied to the outer fields could be reduced. The assumption would be that with large motions, the uncertainty in the motion vector increases with the safe course being to place greater emphasis upon the current field. Moreover, large motions will normally have become blurred through camera integration.

The described circuit employs single motion vectors for each pixel. If separate forward and backward pointing motion vectors were available, it would be appropriate to use forward pointing vectors for the shifter 18 and backward pointing vectors for the shifter 20.

In a further modification, control may be exercised over the decision level at which vertical motion vectors are quantized to even numbers of picture lines. Thus, under certain circumstances, it will be helpful to depart from the conventional rounding approach under which vertical motion compensation is zero for motion vectors up to 1.49; 2 for vertical motion vectors from 1.50 to 2.49 and so on.

Whilst this invention has been described taking the example of interlace-to-progressive conversion, it will apply to other interpolation techniques operating on interlaced signals.

What is claimed is:

1. A motion compensated method of interpolating picture lines in a video signal using vertical motion vectors, comprising the steps of:

a. providing simultaneous access to a current field and to at least two adjacent fields;

b. rounding in number the vertical motion vectors to the nearest even number of picture lines to produce a rounded number of vertical motions vectors;

c. utilizing said rounded number of vertical motion vectors to shift said adjacent fields to produce shifted adjacent fields; and d. utilizing an interpolation aperture taking information from said current field and said shifted adjacent fields to interpolate picture lines, the contributions from said shifted adjacent fields in said interpolation filter summing substantially to zero at low frequencies.

2. A method according to claim 1, adapted for conversion of interface format video signals to progressive format.

3. Apparatus for the interpolation of picture lines in a video signal, comprising delays for providing simultaneous access to a current field and at least two adjacent fields; a source of vertical motion vectors rounded to even numbers of picture lines; a shifter for shifting the adjacent fields in accordance with said vertical motion vectors and an interpolation filter taking information from at least three lines of each of the current and shifted adjacent fields, the contributions from said adjacent fields summing substantially to zero at low frequencies.

* * * * *